Patented Nov. 30, 1926.

1,608,688

UNITED STATES PATENT OFFICE.

ROBERT ELLIOTT WILLIAMSON, OF DENVER, COLORADO, ASSIGNOR TO EDWIN A. STEPHENS, DOING BUSINESS AS E. A. STEPHENS AND COMPANY, OF DENVER, COLORADO.

ANIMAL BAIT.

No Drawing. Application filed December 14, 1925. Serial No. 75,431.

This invention relates to improvements in animal bait of the kind employed by trappers for luring fur bearing animals into the traps.

The object of this invention is to produce a compound containing animal attracting odoriferous and oleaginous substances mixed with such substances as will serve to form the whole into a paste like substance that can be readily packed in sealed collapsible tubes.

Another object is to produce a bait that shall have the required characteristics for successfully attracting wild animals and which at the same time does not employ any wax in its composition but employs in lieu thereof a nonorganic material consisting of crushed pink clay which has been found to serve this purpose better than wax as it is unaffected by heat and cold and which therefore produces a product that can be more readily handled at all temperatures.

The compound in its present preferred form is prepared in accordance with the following formula:

| | Parts |
|---|---|
| Fish oil | 16 |
| Denatured alcohol | 9 |
| Powdered gum asafetida in alcohol solution | 1 |
| Bever castoria in alcohol solution | 1 |
| Horse blood | 5 |

The above ingredients are thoroughly mixed and as they are all liquids produce a resultant liquid mixture to which is added approximately one-third, by volume, of pink clay, which is simply a rock found in Colorado and which has been reduced to powdered form. This powdered clay is added to the liquid and mixed in a mixing machine such as is used by paint companies in the manufacture of paints. After the clay has been mixed with the liquid, the product assumes the consistency of a paste that can be packed into collapsible tubes.

The horse blood is also considered to be an important ingredient and adds greatly to the effectiveness of the bait as it imparts to it the characteristic blood odor that has such a strong appeal to all animals of the carnivorous class. Although horse blood has been designated, and is considered preferable, substantially the same results are obtained by blood from cattle of any kind and the specific mention of horse blood is therefore to be considered as illustrative only and not as a limitation. In the same manner pink clay should be viewed as an example merely of a class and can be replaced by almost any other powdered clay or rock that will give to the paste the required consistency. The clay may be omitted if desired and bait used in liquid form although this is not as convenient or effective as the bait will then dissipate its odors at a faster rate and thereby lose its strength sooner and besides this the stronger odor of the liquid bait serves to arouse the suspicion of the animals and to make them more guarded. The blood may be omitted and an effective bait produced from the remaining elements but when the blood is not present the bait will not be as effective for attracting certain animals such as coyotes.

Having now described the invention what I claim as new is:

1. An animal bait comprising animal attracting odoriferous substances, oleaginous substances, and powdered clay, intermixed to form a homogeneous paste of suitable consistency, for the purpose set forth.

2. A composition of matter comprising fish oil, denatured alcohol, gum asafetida, bever castoria, animal blood and powdered clay.

3. A composition of matter comprising fish oil sixteen parts, denatured alcohol nine parts, powdered gum asafetida one part, bever castoria one part, animal blood five parts and sufficient powdered clay to form a paste of suitable consistency for the purposes specified.

In testimony whereof I affix my signature.

ROBERT ELLIOTT WILLIAMSON.